United States Patent [19]

Laurent

[11] 4,103,501

[45] Aug. 1, 1978

[54] DEVICE FOR EMBEDDING FLEXIBLE ELEMENTS OF GREAT LENGTH IN THE GROUND

[75] Inventor: Jean Laurent, Morainvilliers, France

[73] Assignee: Institut Francais du Petrole, France

[21] Appl. No.: 693,957

[22] Filed: Jun. 8, 1976

[30] Foreign Application Priority Data

Jun. 11, 1975 [FR] France .................. 75 18478

[51] Int. Cl.² .................. A01B 3/64; E02F 3/62; F16L 1/00
[52] U.S. Cl. .................. 61/72.6; 37/193; 172/40
[58] Field of Search .................. 61/72.6, 72.5, 72.7, 61/105; 37/193; 172/40

[56] References Cited

U.S. PATENT DOCUMENTS

| 3,343,739 | 9/1967 | Kinnan | 61/72.6 X |
| 3,429,134 | 2/1969 | Coffey | 61/105 X |
| 3,618,237 | 11/1971 | Davis | 61/72.6 X |
| 3,782,480 | 1/1974 | Schmahl | 61/72.6 X |
| 3,905,200 | 9/1975 | Ylinen | 61/72.6 |

*Primary Examiner*—Jacob Shapiro
*Attorney, Agent, or Firm*—Craig & Antonelli

[57] ABSTRACT

Device for embedding in the ground a line of seismic receivers, comprising handling means for unwinding said line from storage reels placed on a vehicle, means for digging a trench into the ground, including a vibrating tool hauled behind said vehicle, a guiding member for guiding the line to the bottom of the trench, associated to the vibrating tool through elastic means so as to substantially dampen the vibrations imparted to the guiding member and consequently to the receivers of the line guided therewith.

10 Claims, 4 Drawing Figures

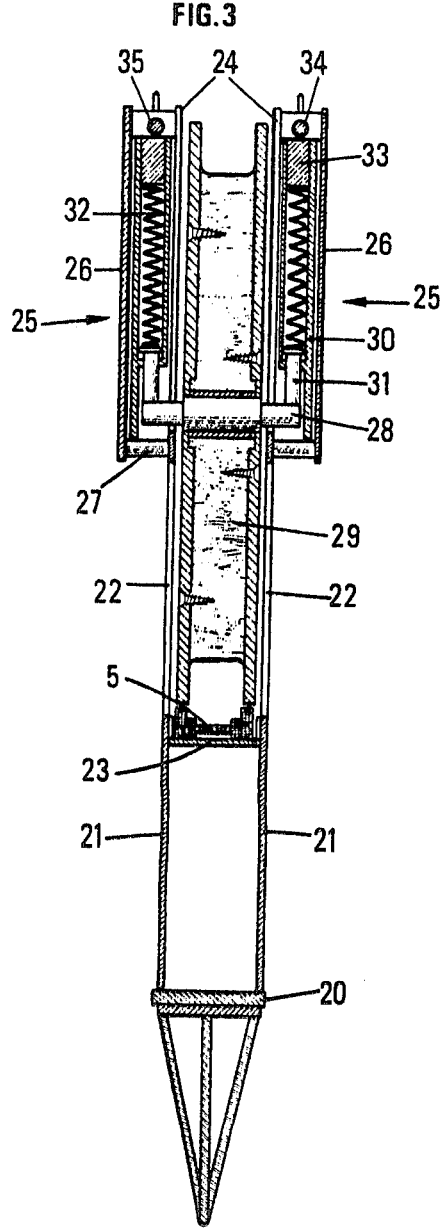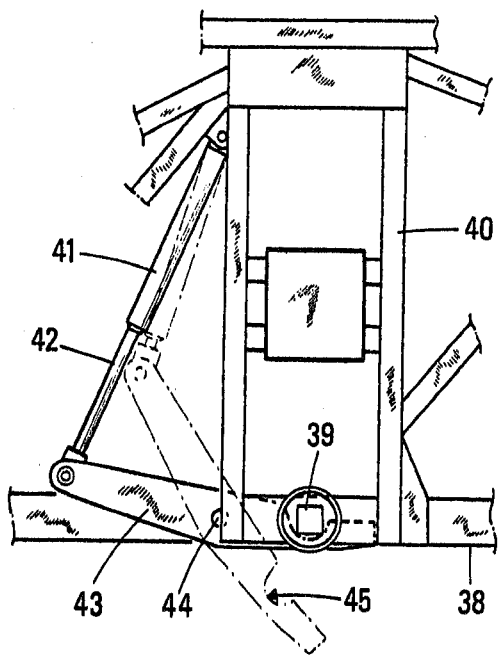
FIG.3
FIG.4

DEVICE FOR EMBEDDING FLEXIBLE ELEMENTS OF GREAT LENGTH IN THE GROUND

The invention relates to a device for embedding in the ground, flexible elements of great length.

The device of the invention is particularly well adapted for embedding in the ground a receiver device of great length for use in seismic prospecting on land.

Such a device may, for example, consist of a plurality of interconnected sections, each of which comprises mainly a shaped strip of flexible material consisting of a bed plate on which geophones are mounted at regular intervals, solid with two wings of a thickness greater than that of the bed plate, through which are provided longitudinal channels housing traction cables and/or multiconductors. The assembly formed by interconnection of the different sections may be wound on a storage reel and unwounded in a trench or groove dug in the ground.

It is known to make use of devices equipped with a vibrating ploughshare for embedding flexible pipes, said devices comprising a frame mounted on wheels and hauled behind a tractor supporting a reel on which is wound a flexible elongate element. A ploughshare carried on the frame is made solid with a vibrator driven by a mechanical or hydraulic motor. The ploughshare is solid at its rear side with a rounded guiding member through which the elongate element is guided to the bottom of the groove or trench dug by the ploughshare.

The known devices are not adapted for embedding in the ground relatively fragile elements such, for example, as a seismic receiver system, inasmuch as the guiding element of the ploughshare through which is guided the receiver assembly is subjected to substantial vibrations, detrimental to geophones which are solid therewith.

The device of the invention comprises means for digging a trench in the ground, including a vibrating tool, a member for guiding the flexible elements to the bottom of the trench and means for fastening the guiding element to the vibrating tool. It is remarkable in that the fastening means comprises elastic means for dampening the vibrations imparted by the vibrating tool to the guiding member.

The elastic means may consist of blocks of elastic material interposed between tenons solid respectively with the vibrating tool and with the guiding member.

It is also remarkable in that the guiding member comprises a guiding path having at least one movable part which may be delimited by a rounded slide and a wheel displacable with respect to the side and spring-means limiting the variations of the spacing between the slide and the wheel.

By this arrangement it is possible to avoid that the flexible element generally and particularly the shaped-strip and the geophones carried thereon be damaged by any sudden stoppage, during the unwinding, which may result, for example, from a blocking of the guiding path.

Other characteristics and advantages of the invention will be made apparent from the following description of a non-limitative embodiment, given with reference to the accompanying drawings wherein:

FIG. 1 diagrammatically shows the whole device for laying, on the bottom of a continuously dug trench, an elongate element wound on a reel;

FIG. 2 diagrammatically shows the tool for embedding and the guiding element;

FIG. 3 is a cross sectional view along line A-A of FIG. 2, and

FIG. 4 is a partial view of the frame carrying a reel for the storage of the flexible elements to be embedded.

Figure 1:
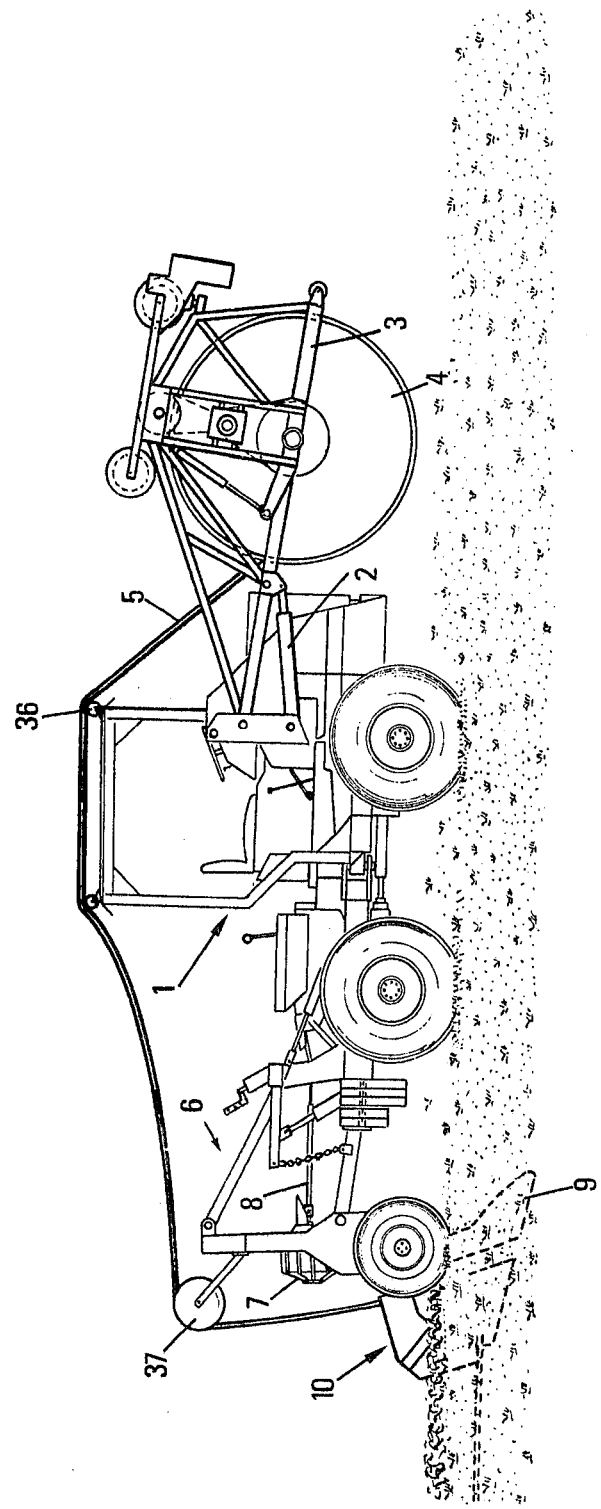

The device illustrated on FIG. 1 comprises a tractor 1 provided with jacks 2 solid with a frame 3 supporting the axle of a storage reel. On this reel is wound, for example, the flexible shaped-strip 5, carrying geophones. A supporting structure 6, mounted on wheels, is connected to the rear side of the tractor. A vibration generator or vibrator 7 of a known type, comprising for example eccentric masses, is arranged on the frame. It is connected through a driving shaft 8 to the motor of the tractor. It may also be controlled by an auxiliary hydraulic motor. In a known manner, the vibrator 7 imparts vibrations to a ploughshare 9 supported by the structure. A guiding element 10 for the carrying geophones shaped-strip is made solid with the ploughshare.

Figure 2:
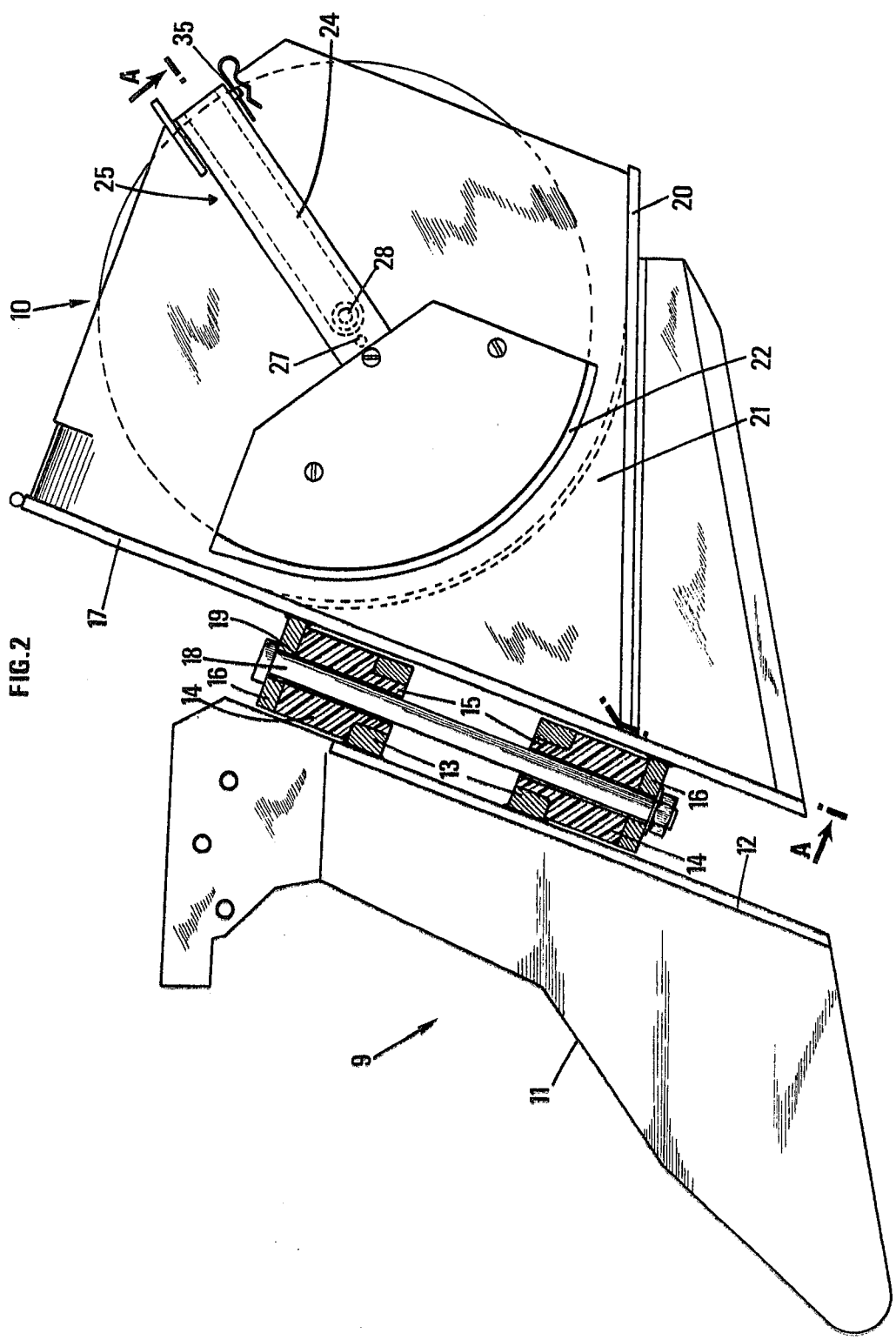

With reference to FIGS. 2 and 3, it is apparent that the ploughshare comprises a leading blade of triangular section 11 and that, on its side (12) opposite to the leading blade, are secured two substantially parallel tenons 13, each of which is provided with an orifice.

A tubular block 14, made of flexible material, for example rubber, is placed on each of the tenons and comprises, at one end, a narrower section 15 in engagement with the orifices provided in said tenons. The two tubular blocks take their bearing, at their ends opposite to the narrower sections, respectively on two flanges 16, solid with the plate 17 of the guiding member 10. A rod 18, engaged with orifices 19 provided in the flanges 16 and with the tubular blocks, co-operate with a nut to fasten the guiding member to the ploughshare 9. The tubular rubber blocks efficiently filter the vibrations imparted to the guiding member by the vibrating ploughshare.

To the plate 17 of the guiding member and to the base plate 20, solid therewith, are secured two lateral flanges 21 substantially parallel to each other and each comprising a recess or opening 22. A rounded slide 23 takes its bearing on the two plates 17 and 20. Each of the flanges 21 is provided with a slot 24 oriented substantially along a radius of slide 23.

Along the external faces of both flanges 21 and in a parallel direction to slots 24 are provided two spring boxes 25. Each of them comprises an external housing 26 secured to an axle 27 solid with each of the two flanges 21. Each housing 26 also comprises a slot facing the slot 24 of each flange.

The axle 28 of a wheel 29 for guiding the geophone-supporting shaped-strip rests on the bottom of slots 24 provided in the two flanges 21.

In each housing 26 is placed a casing 30 through the end wall of which passes a rod 31 on which presses a spring 32. A push member 33, of a diameter adapted to the internal diameter of the casing, presses on each of the springs 32.

Each push member may be made solid with the casing by screwing. It also comprises a tip 34 provided with a hole for introducing a cotter pin 35 whereby it can be secured to casing 30.

The pressure of the springs maintains the axle of the wheel substantially on the bottom of slots 24 of the two lateral flanges 21. However, when during the embedding operations, dug earth is introduced between the slide 23 and the wheel 29, the lateral shift of the latter, which is allowed by the retractation of stems 31 inside casing 30, avoids the shaped-strip to be wedged or stretched and the geophones solid therewith to be damaged.

The reel supporting frame 3 (FIGS. 1 and 4) comprises a small beam 38 provided with a recess 39 and supporting a structure 40 on which is articulated the end portion of the jack body 41.

At the end of the rod 42 of the jack is secured the end of an arm 43, articulated on an axle 44 solid with the small beam 38. The other end of the arm 43 comprises a recess 45.

This recess and that provided in the small beams are at equal distance from the articulation axle 44. By operating jacks 2 and 41, it is possible to bring the support formed by recess 45 below the axle of a reel in storage position and to lift it easily up to the position of use where it is secured against translation movement.

The shaped-strip or elongate element 5 to be embedded is unwound from the storage reel 4 (FIG. 1) and, taking its bearing on the tractor and on the structure 6, is engaged in the rounded slide 23. As the ploughshare and the trench excavation progress, the shaped-strip is lead by a guiding member to the bottom of the trench where it is laid in a substantially horizontal position.

The dug earth discharged on both sides of the ploughshare cover the bottom of the trench. Packing and ramming shoes may be associated to the device behind the guiding member in order to improve the coupling of the geophones with the ground.

What I claim is:

1. A device for embedding flexible elements of great length in the ground, comprising means for handling said flexible elements; means for digging a trench into the ground, said digging means including a vibrating tool; guiding means including at least one guide member for guiding the flexible elements to the bottom of the trench, wherein at least a portion of said guide member includes a guiding path, said portion of said guide member having a wall portion which is linearly displaceable in translation with respect to said guiding path as a result of variations of cross-section of said flexible elements; and means for suspending said guide member from said vibrating tool, wherein suspending means includes constituted by elastic material for dampening vibrations imparted from said vibrating tool to said guide member.

2. A device according to claim 1, wherein said handling means includes movable means for loading a storage reel, said movable means including a support for the axle of said storage reel.

3. A device according to claim 2, wherein said support is defined by complementary recesses provided respectively in stationary arms and arms displaceable with respect to said stationary arms.

4. A device for embedding flexible elements of great length in the ground, comprising means for handling said flexible elements; means for digging a trench into the ground, said digging means including a vibrating tool; guiding means including at least one guide member for guiding the flexible elements to the bottom of the trench, wherein at least a portion of said guide member includes a guiding path, said portion of said guide member having a wall portion which is linearly displaceable in translation with respect to the guiding path from a neutral position as a result of variations of cross-section of said flexible elements, and said guiding means including means for applying return forces to said wall portion when displaced from said neutral position; and means for suspending said guide member from said vibrating tool, wherein said suspending means includes members constituted by elastic material for dampening vibrations imparted from said vibrating tool to said guide member.

5. A device according to claim 4, wherein said guiding path is delimited by a rounded slide member and said wall portion is a peripheral surface of a wheel provided with an axle and linearly displaceable by translation with respect to the rounded slide member, and wherein said means for applying return forces includes spring means.

6. A device according to claim 5, wherein said guiding means further comprises means fixed with the rounded slide member for guiding in translation said wheel with respect to said slide, said spring means comprising casings in a stationary position with respect to said slide and springs guided in said casings and exerting repelling forces on said wheel axle.

7. A device according to claim 5, wherein said peripheral surface of said wheel has a curvature corresponding to the curvature of said rounded slide member, and wherein said wheel is displaceable in the direction of the respective centers of curvature.

8. A device for embedding flexible elements of great length in a previously dug trench comprising means for handling said flexible elements; and guiding means including at least one guide member for guiding the flexible elements to the bottom of the trench, at least a portion of said guide member defining a guiding path, wherein said portion of said guide member comprises a wall portion which is rectilinearly displaceable in translation with respect to the guiding path as a result of variations of cross-section of the flexible elements.

9. A device according to claim 8, wherein said guiding path is delimited by a rounded slide member and said wall portion is a peripheral surface of a wheel provided with an axle and rectilinearly displaceable by translation with respect to the rounded slide member.

10. A device according to claim 9, wherein said peripheral surface of said wheel has a curvature corresponding to the curvature of said rounded slide member, and wherein said wheel is displaceable in the direction of the respective centers of curvature.

* * * * *